(12) United States Patent
Min (10) Patent No.: US 11,987,297 B2
(45) Date of Patent: May 21, 2024

(54) MOTOR-DRIVEN POWER STEERING SYSTEM AND CONTROL METHOD THEREOF

(71) Applicant: HL MANDO CORPORATION, Pyeongtaek (KR)

(72) Inventor: Hyogi Min, Yongin (KR)

(73) Assignee: HL MANDO CORPORATION, Pyeongtaek (KR)

( * ) Notice: Subject to any disclaimer, the term of this patent is extended or adjusted under 35 U.S.C. 154(b) by 262 days.

(21) Appl. No.: 17/727,831

(22) Filed: Apr. 25, 2022

(65) Prior Publication Data

US 2022/0348252 A1   Nov. 3, 2022

(30) Foreign Application Priority Data

Apr. 28, 2021 (KR) ........................ 10-2021-0055276

(51) Int. Cl.
B62D 5/04 (2006.01)

(52) U.S. Cl.
CPC ......... B62D 5/0469 (2013.01); B62D 5/0454 (2013.01); B62D 5/0463 (2013.01); B62D 5/0481 (2013.01); B62D 5/0421 (2013.01)

(58) Field of Classification Search
CPC .. B62D 5/0469; B62D 5/0454; B62D 5/0463; B62D 5/0481; B62D 5/0421; B62D 15/0235; B62D 5/0409; B62D 15/021; B62D 15/0245; B62D 5/0457; B62D 6/10
USPC ........................................................ 701/41
See application file for complete search history.

(56) References Cited

U.S. PATENT DOCUMENTS

| 6,175,793 | B1 * | 1/2001 | Ironside .................. F16H 57/01 280/93.5 |
| 8,428,822 | B2 * | 4/2013 | Shartle ............... B62D 15/0245 701/41 |
| 8,862,325 | B2 * | 10/2014 | Soos ................... B62D 15/0235 701/41 |
| 11,072,362 | B2 * | 7/2021 | Shirauchi ............. B62D 5/0424 |
| 2003/0229430 | A1 * | 12/2003 | Beek ......................... B62D 5/09 180/443 |

(Continued)

FOREIGN PATENT DOCUMENTS

| KR | 20170043169 A | 4/2017 |
| KR | 101885841 B1 | 8/2018 |

*Primary Examiner* — Sizo B Vilakazi
*Assistant Examiner* — Brian R Kirby
(74) *Attorney, Agent, or Firm* — Harvest IP Law, LLP (57) ABSTRACT

Provided is a motor-driven power steering system including: a motor driver; and a controller, wherein the controller is configured to: receive a first rotation angle obtained by a steering wheel angle sensor according to steering and a second rotation angle obtained by a motor position sensor, when a steered position of the steering wheel is in an auxiliary steering limit section and a difference value between the first rotation angle and the second rotation angle is different from a predetermined reference value, change a rotation position of the steering wheel angle sensor and a rotation position of the motor position sensor to an initial original position, when changed to the initial original position, receive the first rotation angle and the second rotation angle again, and control the motor driver to perform auxiliary steering based on the first rotation angle and the second rotation angle received again.

12 Claims, 7 Drawing Sheets

(56) References Cited

U.S. PATENT DOCUMENTS

| | | | |
|---|---|---|---|
| 2004/0188172 A1* | 9/2004 | Asada | B62D 15/0235 |
| | | | 180/446 |
| 2005/0087388 A1* | 4/2005 | Turner | B62D 6/002 |
| | | | 180/446 |
| 2006/0022619 A1* | 2/2006 | Koike | B62D 5/0469 |
| | | | 318/52 |
| 2008/0281490 A1* | 11/2008 | Wittig | B62D 5/0457 |
| | | | 701/41 |
| 2009/0026004 A1* | 1/2009 | Hidaka | B62D 5/008 |
| | | | 701/41 |
| 2013/0006474 A1* | 1/2013 | Pyo | B62D 6/00 |
| | | | 701/41 |
| 2013/0113173 A1* | 5/2013 | Bilmayer | B62D 5/0442 |
| | | | 280/93.514 |
| 2014/0142810 A1* | 5/2014 | Watanabe | B62D 5/0481 |
| | | | 701/41 |
| 2014/0208890 A1* | 7/2014 | Takayanagi | B62D 15/0245 |
| | | | 74/552 |
| 2018/0013370 A1* | 1/2018 | Lee | H02P 25/03 |
| 2018/0257704 A1* | 9/2018 | Minaki | B62D 5/0463 |
| 2018/0346018 A1* | 12/2018 | Kataoka | B62D 5/0463 |
| 2019/0023313 A1* | 1/2019 | Zuzelski | B62D 5/0481 |
| 2019/0233000 A1* | 8/2019 | Matsuda | B62D 5/006 |

\* cited by examiner

MOTOR-DRIVEN POWER STEERING SYSTEM AND CONTROL METHOD THEREOF

CROSS-REFERENCE TO RELATED APPLICATION

This application is based on and claims priority under 35 U.S.C. § 119 to Korean Patent Application No. 10-2021-0055276, filed on Apr. 28, 2021 in the Korean Intellectual Property Office, the disclosure of which is incorporated herein by reference.

BACKGROUND

1. Technical Field

The disclosure relates to a motor-driven power steering system that may improve a performance of steering assistance and a control method thereof.

2. Background Art

In general, an automotive steering device is for changing a travelling direction of a vehicle according to a driver's intention, i.e., for assisting the driver to drive the vehicle in a desired direction by changing a rotational center of front wheels.

The steering device includes a hydraulic power steering system using a hydraulic pump, a motor-driven power steering system using a motor, and the like.

The motor-driven power steering system provides auxiliary steering force by driving the motor when a driver operates a steering wheel of the vehicle in order to reduce a driver's burden of steering.

In a conventional motor-driven power steering system, however, a rotation angle of steering wheel and a rotation angle of motor were misaligned in an auxiliary steering limit section, preventing a steering assistance performance from being improved.

SUMMARY

An aspect of the disclosure provides a motor-driven power steering system and a control method thereof that may prevent a rotation angle of a steering wheel and a rotation angle of a motor from being misaligned in an auxiliary steering limit section to improve a steering assistance performance.

Additional aspects of the disclosure will be set forth in part in the description which follows and, in part, will be obvious from the description, or may be learned by practice of the disclosure.

According to an aspect of the disclosure, there is provided a motor-driven power steering system that assists in steering by transmitting auxiliary steering power by driving a motor when a steering wheel is steered, the motor-driven power steering system including: a motor driver configured to drive the motor; and a controller electrically connected to the motor driver, wherein the controller is configured to: receive a first rotation angle obtained by a steering wheel angle sensor according to steering of the steering wheel and a second rotation angle obtained by a motor position sensor, when a steered position of the steering wheel is in an auxiliary steering limit section and a difference value between the first rotation angle and the second rotation angle is different from a predetermined reference value, change a rotation position of the steering wheel angle sensor and a rotation position of the motor position sensor to an initial original position, when changed to the initial original position, receive the first rotation angle obtained by the steering wheel angle sensor according to steering of the steering wheel and the second rotation angle obtained by the motor position sensor again, and control the motor driver to perform auxiliary steering based on the first rotation angle and the second rotation angle received again.

When the difference value between the first rotation angle and the second rotation angle is different from the predetermined reference value, the controller is configured to determine that a slip between a worm wheel, engaged with a worm connected to the motor, and an auxiliary pinion occurs.

The controller is configured to: when the difference value between the first rotation angle and the second rotation angle is different from the predetermined reference value, further receive a rotation speed obtained by the motor position sensor and a steering torque obtained by a torque sensor, when the rotation speed and the steering torque are in a forward direction, further determine whether a first difference value between the second rotation angle and the first rotation angle is greater than a first predetermined reference value, when the first difference value is greater than the first predetermined reference value, further determine whether a first holding time during which the first difference value remains greater than the first predetermined reference value is longer than a first predetermined reference time, and when the first holding time is longer than the first predetermined reference time, further change the rotation position of the steering wheel angle sensor and the rotation position of the motor position sensor to the initial original position.

The controller is configured to: when the difference value between the first rotation angle and the second rotation angle is different from the predetermined reference value, further receive a rotation speed obtained by the motor position sensor and a steering torque obtained by a torque sensor, when the rotation speed and the steering torque are in a reverse direction, further determine whether a second difference value between the second rotation angle and the first rotation angle is less than a second predetermined reference value, when the second difference value is less than the second predetermined reference value, further determine whether a second holding time during which the second difference value remains less than the second predetermined reference value is longer than a second predetermined reference time, and when the second holding time is longer than the second predetermined reference time, further change the rotation position of the steering wheel angle sensor and the rotation position of the motor position sensor to the initial original position.

The controller is configured to be electrically connected to an ignition switch, and after the ignition switch is turned on, synchronize and receive the first rotation angle obtained by the steering wheel angle sensor and the second rotation angle obtained by the motor position sensor.

When changed to the initial original position, the controller is configured to synchronize and receive the first rotation angle obtained by the steering wheel angle sensor and the second rotation angle obtained by the motor position sensor again.

According to another aspect of the disclosure, there is provided a control method of a motor-driven power steering system that assists in steering by transmitting auxiliary steering power by driving a motor when a steering wheel is steered, the control method including: receiving a first rotation angle obtained by a steering wheel angle sensor according to steering of the steering wheel and a second rotation angle obtained by a motor position sensor; determining whether a steered position of the steering wheel is in an auxiliary steering limit section; determining whether the steered position of the steering wheel is in the auxiliary steering limit section and a difference value between the first rotation angle and the second rotation angle is different from a predetermined reference value; when the difference value between the first rotation angle and the second rotation angle is different from the predetermined reference value, changing a rotation position of the steering wheel angle sensor and a rotation position of the motor position sensor to an initial original position, when changed to the initial original position, receiving a first rotation angle obtained by the steering wheel angle sensor according to steering of the steering wheel and a second rotation angle obtained by the motor position sensor again, and performing auxiliary steering based on the first rotation angle and the second rotation angle received again.

When the difference value between the first rotation angle and the second rotation angle is different from the predetermined reference value, it is determined that a slip between a worm wheel, engaged with a worm connected to the motor, and an auxiliary pinion occurs.

When the difference value between the first rotation angle and the second rotation angle is different from the predetermined reference value, the changing to the initial original position further receives a rotation speed obtained by the motor position sensor and a steering torque obtained by a torque sensor, further determines whether the rotation speed and the steering torque are in a forward direction, when the rotation speed and the steering torque are in the forward direction, further determines whether a first difference value between the second rotation angle and the first rotation angle is greater than a first predetermined reference value, when the first difference value is greater than the first predetermined reference value, further determines whether a first holding time during which the first difference value remains greater than the first predetermined reference value is longer than a first predetermined reference time, and when the first holding time is longer than the first predetermined reference time, further changes the rotation position of the steering wheel angle sensor and the rotation position of the motor position sensor to the initial original position.

When the difference value between the first rotation angle and the second rotation angle is different from the predetermined reference value, the changing to the initial original position further receives a rotation speed obtained by the motor position sensor and a steering torque obtained by a torque sensor, further determines whether the rotation speed and the steering torque are in a reverse direction, when the rotation speed and the steering torque are in the reverse direction, further determines whether a second difference value between the second rotation angle and the first rotation angle is less than a second predetermined reference value, when the second difference value is less than the second predetermined reference value, further determines whether a second holding time during which the second difference value remains less than the second predetermined reference value is longer than a second predetermined reference time, and when the second holding time is longer than the second predetermined reference time, further changes the rotation position of the steering wheel angle sensor and the rotation position of the motor position sensor to the initial original position.

The receiving of the first rotation angle and the second rotation angle synchronizes and receives the first rotation angle obtained by the steering wheel angle sensor and the second rotation angle obtained by the motor position sensor, after an ignition switch for starting the motor-driven power steering system is turned on.

When changed to the initial original position, the receiving of the first rotation angle and the second rotation angle again synchronizes and receives the first rotation angle obtained by the steering wheel angle sensor and the second rotation angle obtained by the motor position sensor again.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Like reference numerals throughout the specification denote like elements. Also, this specification does not describe all the elements according to embodiments of the disclosure, and descriptions well-known in the art to which the disclosure pertains or overlapped portions are omitted. The terms such as "~part", "~member", "~module", "~block", and the like may refer to at least one process processed by at least one hardware or software. According to embodiments, a plurality of "~part", "~member", "~module", "~block" may be embodied as a single element, or a single of "~part", "~member", "~module", "~block" may include a plurality of elements.

It will be understood that when an element is referred to as being "connected" to another element, it can be directly or indirectly connected to the other element, wherein the indirect connection includes "connection" via a wireless communication network.

It will be understood that the term "include" when used in this specification, specifies the presence of stated features, integers, steps, operations, elements, and/or components, but do not preclude the presence or addition of one or more other features, integers, steps, operations, elements, components, and/or groups thereof.

It will be understood that when it is stated in this specification that a member is located "on" another member, not only a member may be in contact with another member, but also still another member may be present between the two members.

It will be understood that, although the terms first, second, etc. may be used herein to describe various elements, these elements should not be limited by these terms. It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

Figure 1:
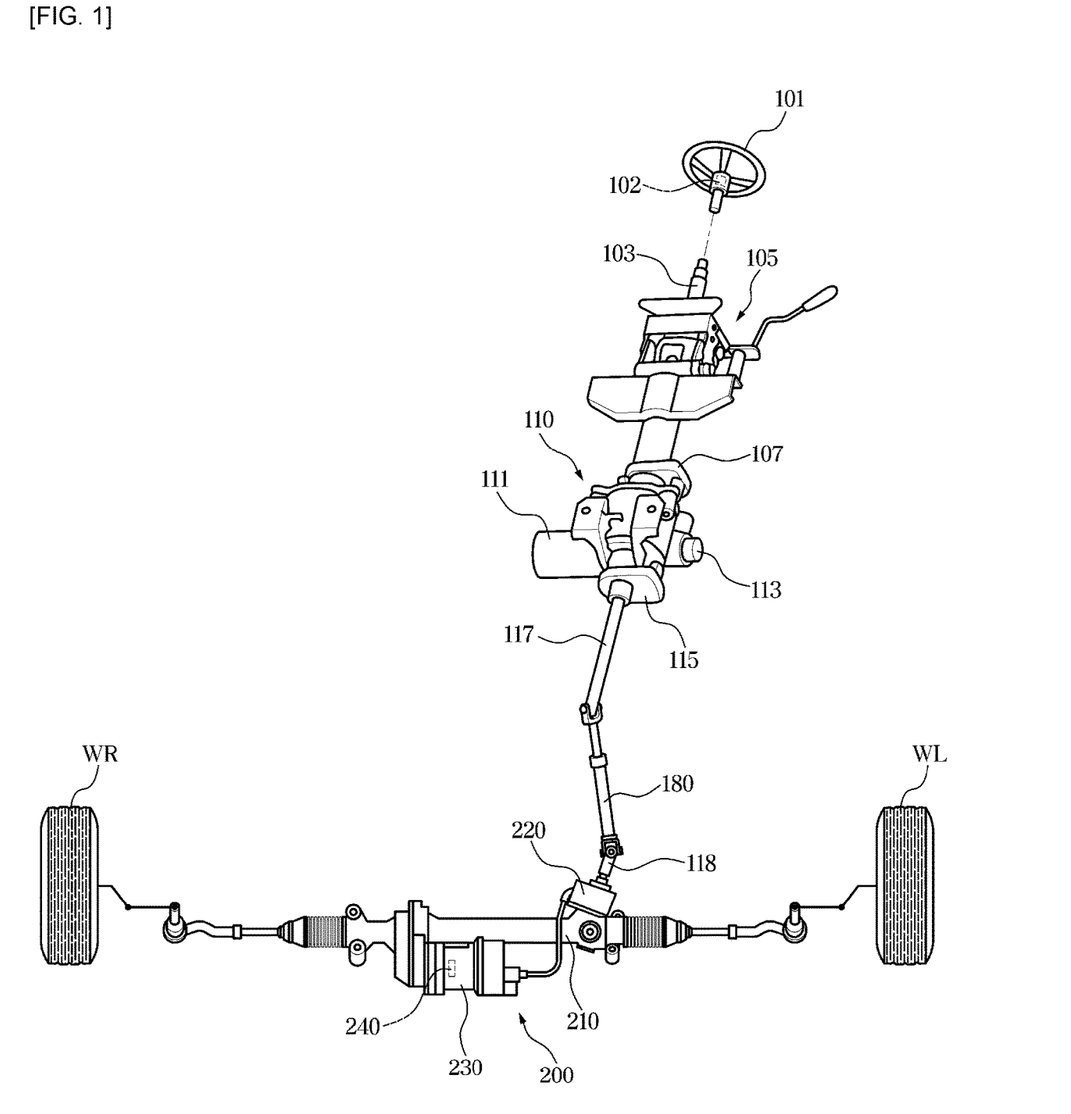
FIG. 1 illustrates a configuration of a steering device according to an embodiment.

FIG. 1 illustrates a configuration of a steering device according to an embodiment.

Referring to FIG. 1, the steering device may include a first steering portion 100 and a second steering portion 200.

The first steering portion 100 is a column-type motor-driven power steering (MDPS) and may include a steering wheel angle sensor 102 provided in a steering wheel 101, an input shaft 103 connected to the steering wheel 101, a steering column 105 surrounding the input shaft 103, and a steering angle sensor 107 installed at a lower end of the steering column 105. The steering wheel angle sensor 102 may obtain a first rotation angle of the steering wheel 101 and transmit the first rotation angle to a controller 320. The steering wheel angle sensor 102 may be mounted on a clock spring of the steering wheel 101. The steering angle sensor 107 may obtain a rotation angular velocity of the input shaft 103 and transmit the rotation angular velocity to the controller 320.

The first steering portion 100 may include a planetary gear 110 provided below the steering angle sensor 107, and a planetary gear motor 111 for driving the planetary gear 110 to vary a variable ratio of the planetary gear 110. The planetary gear 110 may be provided so that a ratio between a rotation angle of the input shaft 103 and a rotation angle of a first output shaft 117 is variable. One side of the planetary gear 110 may be connected to the input shaft 103 that receives power of the steering wheel 101. The other side of the planetary gear 110 may be connected to the first output shaft 117 that transmits power to the second steering portion 200.

The first steering portion 100 may include a planetary gear motor position sensor 113 mounted on the planetary gear motor 111 and a torque and angle sensor 115 provided at a lower end of the planetary gear 110. The planetary gear motor position sensor 113 may obtain a rotation speed and/or a rotation angle of the planetary gear motor 111 and transmit the rotation speed and/or the rotation angle to the controller 320. The torque and angle sensor 115 may obtain a torque and a rotation angular velocity of the first output shaft 117 and transmit the torque and rotation angular velocity to the controller 320.

The second steering portion 200 is a rack-type MDPS, and may include a gear box 210 and a torque sensor 220. Although not illustrated, a pinion provided at an end of a second output shaft 118 and a rack bar 211 (refer to FIG. 2) converted into a liner motion by rotation of the pinion may be provided inside the gear box 210. The rack bar 211 (refer to FIG. 2) may move to the left or right according to a rotation direction of the pinion. The torque sensor 220 may obtain a torque of the second output shaft 118 and transmit the torque to the controller 320.

Figure 2:
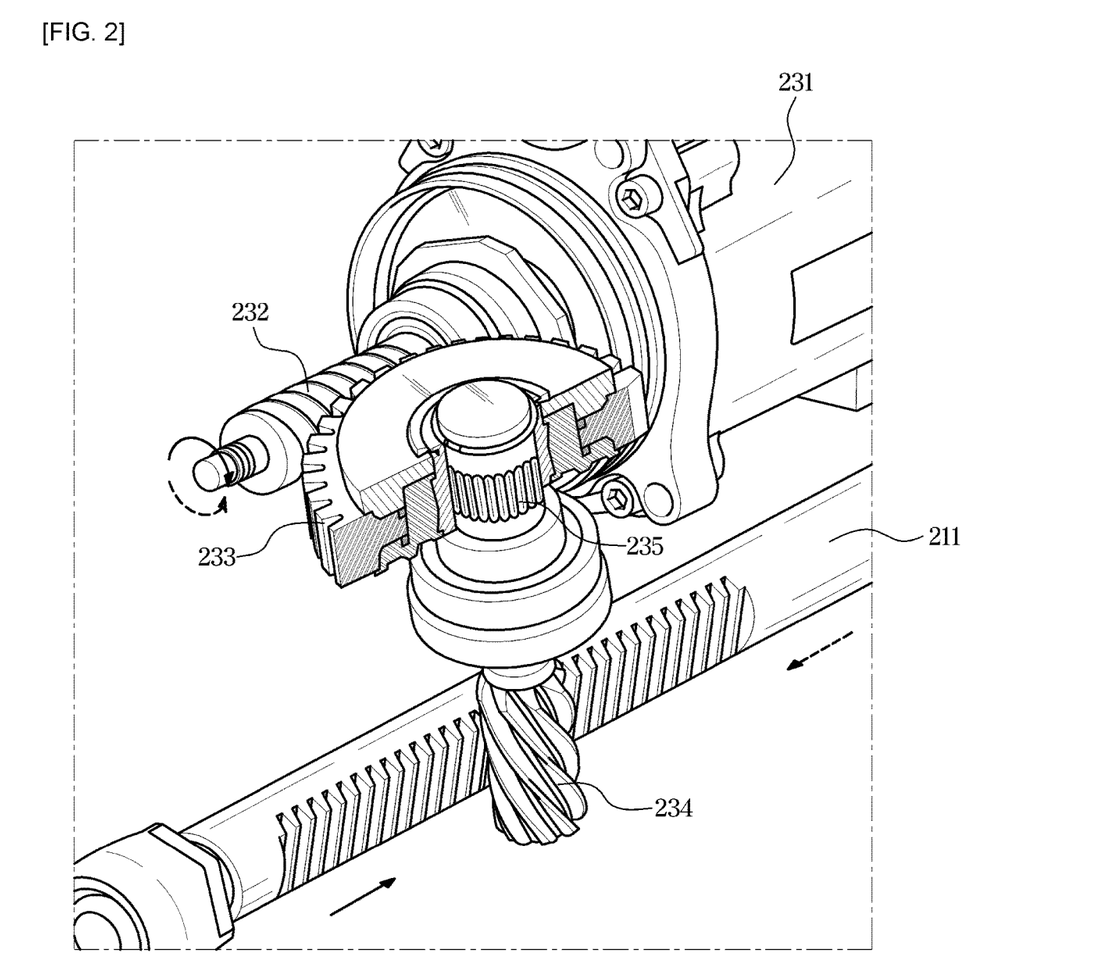
FIG. 2 illustrates a configuration of a worm wheel connected to a motor, an auxiliary pinion and a rack bar.

FIG. 2 illustrates a configuration of a worm wheel connected to a motor, an auxiliary pinion and a rack bar.

Referring to FIGS. 1 and 2, the second steering portion 200 may include a motor unit 230 that transmits auxiliary steering power to the rack bar 211 to assist in steering based on a torque of the torque sensor 220, and a motor position sensor 240 provided in the motor unit 230.

The motor unit 230 may include a worm 232 rotating in one or the other direction by driving a motor 231, a worm wheel 233 engaged with the worm 232 and rotating in one or the other direction, and an auxiliary pinion 234 engaged with the rack bar 211 and transmitting auxiliary steering power to the rack bar 211 by rotation of the worm wheel 233.

The rack bar 211 may move to the left or right according to a rotation direction of the auxiliary pinion 234. When the steering wheel 101 is steered, the motor 231 may transmit auxiliary steering power to the rack bar 211 to assist steering of vehicle wheels WL and WR. The motor position sensor 240 mounted on the motor 231 may obtain a rotation speed and/or a rotation angle of the motor 231 and transmit the rotation speed and/or the rotation angle to the controller 320.

A tolerance ring 235 may be provided between the worm wheel 233 and the auxiliary pinion 234. When a torque transmitted through the worm wheel 233 is large, the tolerance ring 235 allows a slip between the worm wheel 233 and the auxiliary pinion 234 to protect a mechanism and system.

Figure 3:
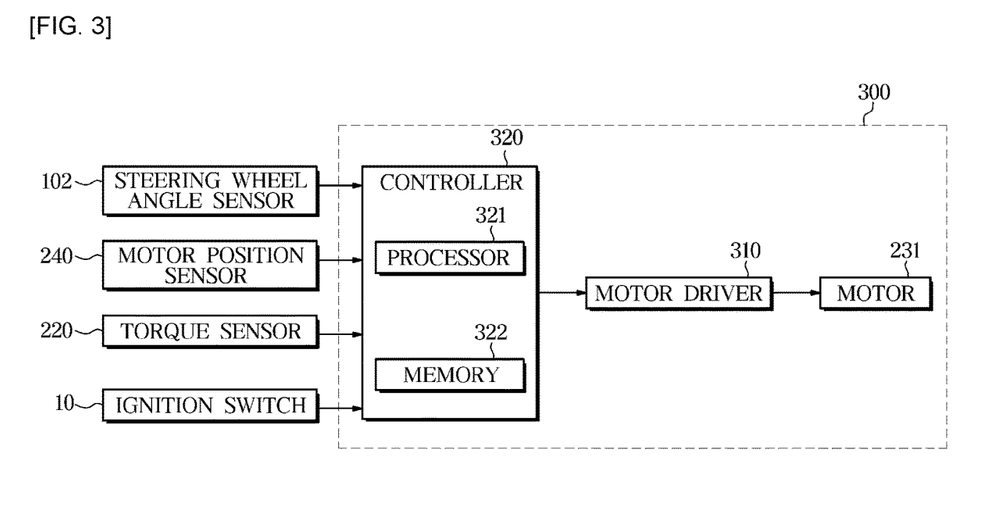
FIG. 3 illustrates a configuration of a motor-driven power steering system according to an embodiment.

FIG. 3 illustrates a configuration of a motor-driven power steering system according to an embodiment.

Referring to FIG. 3, a motor-driven power steering system 300 includes the motor 231, a motor driver 310 and the controller 320.

The motor driver 310 drives the motor 231. The motor driver 310 may drive the motor 231 in a forward or reverse direction. For example, the motor driver 310 may include an H-bridge circuit including a plurality of power switching elements to drive the motor 231 in a forward or reverse direction.

The controller 320 is electrically connected to the motor driver 310. The controller 320 may be electrically connected to the steering wheel angle sensor 102, the motor position sensor 240, the torque sensor 220, and an ignition switch 10.

The controller 320 rotates the motor 231 in a forward or reverse direction through the motor driver 310, so that the worm wheel 233 engaged with the worm 232 rotates in one and the other direction and the auxiliary pinion 234 engaged with the rack bar 211 transmits auxiliary steering power to the rack bar 322 by rotation of the worm wheel 233, in order to assist steering of the vehicle wheels WL and WR.

According to an embodiment, when a steered position of the steering wheel 101 is in an auxiliary steering limit section, the motor-driven power steering system 300 may prevent a rotation angle of the steering wheel 101 and a rotation angle of the motor 231 from being misaligned, thereby improving a steering assistance performance.

The controller 320 includes a processor 321 and a memory 322.

The processor 320 receives a first rotation angle obtained by the steering wheel angle sensor 102 according to steering of the steering wheel 101 and a second rotation angle obtained by the motor position sensor 240. Because the processor 321 receives the first rotation angle through a controller area network (CAN) communication, in order to prevent a steering performance from being deteriorated due to delay, the processor 321 may synchronize and receive the first rotation angle obtained by the steering wheel angle sensor 102 and the second rotation angle obtained by the motor position sensor 240, after the ignition switch 10 is turned on.

Figure 4:
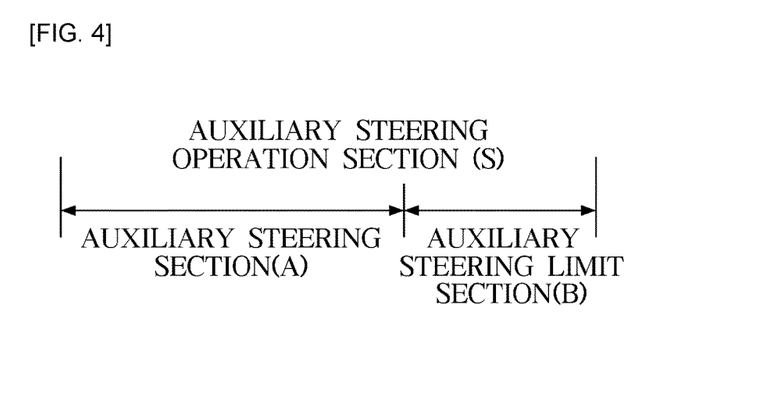
FIG. 4 illustrates an auxiliary steering operation section.

FIG. 4 illustrates an auxiliary steering operation section.

Figure 5:
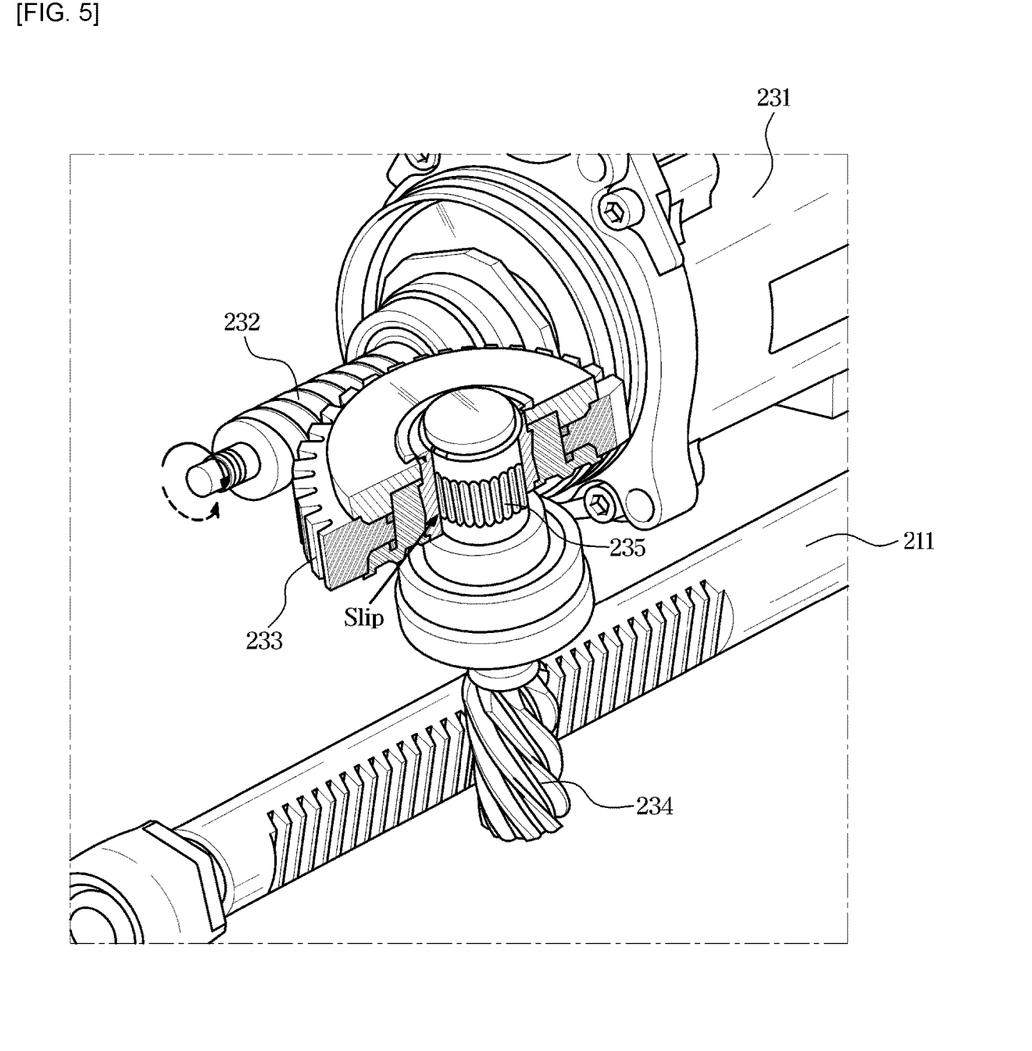
FIG. 5 illustrates a state where a slip between a worm wheel and an auxiliary pinion occurs in an auxiliary steering limit section.

FIG. 5 illustrates a state where a slip between a worm wheel and an auxiliary pinion occurs in an auxiliary steering limit section.

Referring to FIG. 4, the processor 321 determines whether a steered position of the steering wheel 101 is in an auxiliary steering limit section B. An auxiliary steering operation section S may include an auxiliary steering section A and the auxiliary steering limit section B. The auxiliary steering section A is a section where auxiliary steering is performed through transmission of auxiliary steering power by driving of the motor 231 depending on a degree of torsion of a torsion bar 180 by engaging the worm 232, connected to the motor 231, with the worm wheel 233, when the steering wheel 101 is steered.

Although a driver may further steer the steering wheel 101, the auxiliary steering limit section B as a high torque section, as shown in FIG. 5, is for protecting a mechanism and system from damage by the tolerance ring 235 which allows a slip between the worm wheel 233, engaged with the worm 232 connected to the motor 231 and the auxiliary pinion 234. In the auxiliary steering limit section B, the rotation angle of the steering wheel 101 and the rotation angle of the motor 231 are misaligned.

The processor 321 determines whether the steered position of the steering wheel 101 is in the auxiliary steering limit section B and a difference value between a first rotation angle obtained by the steering wheel angle sensor 102 and a second rotation angle obtained by the motor position sensor 240 is different from a predetermined reference value. When the difference value between the first rotation angle obtained by the steering wheel angle sensor 102 and the second rotation angle obtained by the motor position sensor 240 is different from the predetermined reference value, the processor 321 may determine that a slip between the worm wheel 233, engaged with the worm 232 connected to the motor 231, and the auxiliary pinion 234 occurs, as shown in FIG. 5. When the slip between the worm wheel 233 and the auxiliary pinion 234 occurs, the motor 231 runs idle, and thus the second rotation angle of the motor position sensor 240 and the first rotation angle of the steering wheel angle sensor 102 may be misaligned.

Accordingly, when the difference value between the first rotation angle obtained by the steering wheel angle sensor 102 and the second rotation angle obtained by the motor position sensor 240 is different from the predetermined reference value, the processor 321 changes a rotation position of the steering wheel angle sensor 102 and a rotation position of the motor position sensor 240 to an initial original position. When the slip between the worm wheel 233 and the auxiliary pinion 234 occurs, the processor 321 may change the rotation position of the steering wheel angle sensor 102 and the rotation position of the motor position sensor 240 to the initial original position.

Also, when the difference value between the first rotation angle obtained by the steering wheel angle sensor 102 and the second rotation angle obtained by the motor position sensor 240 is different from the predetermined reference value, the processor 321 may further receive a rotation speed obtained by the motor position sensor 240 and a steering torque obtained by the torque sensor 220.

When the rotation speed of the motor position sensor 240 and the steering torque of the torque sensor 220 are in a forward direction, the processor 321 may determine whether a first difference value between the second rotation angle of the motor position sensor 240 and the first rotation angle of the steering wheel angle sensor 102 is greater than a first predetermined reference value. When the rotation speed of the motor position sensor 240 and the steering torque of the torque sensor 220 are in the forward direction in a state where the slip between the worm wheel 233 and the auxiliary pinion 234 occurs, the second rotation angle of the motor position sensor 240 increases but the first rotation angle of the steering wheel angle sensor 102 decreases, thereby being misaligned. Accordingly, the processor 321 may further determine whether the first difference value is greater than the first predetermined reference value.

When the first difference value between the second rotation angle of the motor position sensor 240 and the first rotation angle of the steering wheel angle sensor 102 is greater than the first predetermined reference value, the processor 321 may further determine whether a first holding time during which the first difference value remains greater than the first predetermined reference value is longer than a first predetermined reference time.

When the first holding time during which the first difference value between the second rotation angle of the motor position sensor 240 and the first rotation angle of the steering wheel angle sensor 102 remains greater than the first predetermined reference value is longer than the first predetermined reference time, the processor 321 may further change the rotation position of the steering wheel angle sensor 102 and the rotation position of the motor position sensor 240 to the initial original position.

Also, when the rotation speed of the motor position sensor 240 and the steering torque of the torque sensor 220 are in a reverse direction, the processor 321 may further determine whether a second difference value between the second rotation angle of the motor position sensor 240 and the first rotation angle of the steering wheel angle sensor 102 is less than a second predetermined reference value. When the rotation speed of the motor position sensor 240 and the steering torque of the torque sensor 220 are in the reverse direction in a state where a slip between the worm wheel 233 and the auxiliary pinion 234 occurs, the second rotation angle of the motor position sensor 240 decreases but the first rotation angle of the steering wheel angle sensor 102 increases, thereby being misaligned. Accordingly, the processor 321 may further determine whether the second difference value is less than the second predetermined reference value.

When the second difference value between the second rotation angle of the motor position sensor 240 and the first rotation angle of the steering wheel angle sensor 102 is less than the second predetermined reference value, the processor 321 may further determine whether a second holding time during which the second difference value remains less than the second predetermined reference value is longer than a second predetermined reference time.

When the second holding time during which the second difference value remains less than the second predetermined reference value is longer than the second predetermined reference time, the processor 321 may further change the rotation position of the steering wheel angle sensor 102 and the rotation position of the motor position sensor 240 to the initial original position.

When changed to the initial original position, the processor 321 receives the first rotation angle, obtained by the steering wheel angle sensor 102 according to steering of the steering wheel 101, and the second rotation angle obtained by the motor position sensor 240 again. The processor 321 may synchronize and receive the first rotation angle obtained by the steering wheel angle sensor 102 and the second rotation angle obtained by the motor position sensor 240 again.

The processor 321 controls the motor driver 310 that drives the motor 231 to perform auxiliary steering based on the first rotation angle of the steering wheel angle sensor 102 and the second rotation angle of the motor position sensor 240 which are received again. The processor 321 may control the motor driver 310, which drives the motor 231 depending on a degree of torsion of the torsion bar 180, to assist steering of the vehicle wheels WL and WR, by transmitting auxiliary steering power to the rack bar 211 by the auxiliary pinion 234, engaged with the rack bar 211, by rotation of the worm 232 and the worm wheel 233.

The processor 321 may include a digital signal processor to receive and process an cony signal of the ignition switch 10, rotation angle detection data, rotation speed detection data and steering torque detection data, and change and process the rotation position of the steering wheel angle sensor 102 and the rotation position of the motor position sensor 240 to the initial original position. Here, the rotation angle detection data is acquired by the steering wheel angle sensor 102 and/or the motor position sensor 240, the rotation speed detection data is acquired by the motor position sensor 240, and the steering torque detection data is acquired by the torque sensor 220.

The processor 321 may include a micro control unit (MCU) that generates a synchronization signal for synchronizing and receiving the first rotation angle of the steering wheel angle sensor 102 and the second rotation angle of the motor position sensor 240 and generates a control signal for controlling the motor driver 310 to assist steering.

The memory 322 may store a program and/or data for the processor 321 to receive and process the cony signal of the ignition switch 10, a program and/or data for the processor 321 to receive and process the rotation angle detection data acquired by the steering wheel angle sensor 102 and/or the motor position sensor 240, a program and/or data for the processor 321 to receive and process the rotation speed detection data acquired by the motor position sensor 240, a program and/or data for the processor 321 to receive and process the steering torque detection data acquired by the torque sensor 220, and a program and/or data for the processor 321 to change and process the rotation position of the steering wheel angle sensor 102 and the rotation position of the motor position sensor 240 to the initial original position.

The memory 322 may also store a program and/or data for generating the synchronization signal so that the processor 321 synchronizes and receives the first rotation angle of the steering wheel angle sensor 102 and the second rotation angle of the motor position sensor 240, and a program and/or data for generating the control signal for controlling the motor driver 310 to assist steering.

The memory 322 may temporarily store the cony signal of the ignition switch 10, the rotation angle detection data acquired by the steering wheel angle sensor 102 and/or the motor position sensor 240, the rotation speed detection data acquired by the motor position sensor 240, the steering torque detection data acquired by the torque sensor 220, and a processing result of the processor 321.

The memory 322 may include a volatile memory such as a static random access memory (S-RAM) and dynamic random access memory (D-RAM), and a non-volatile memory such as a flash memory, a read only memory (ROM), an erasable programmable read only memory (EPROM), and the like.

Figure 6:
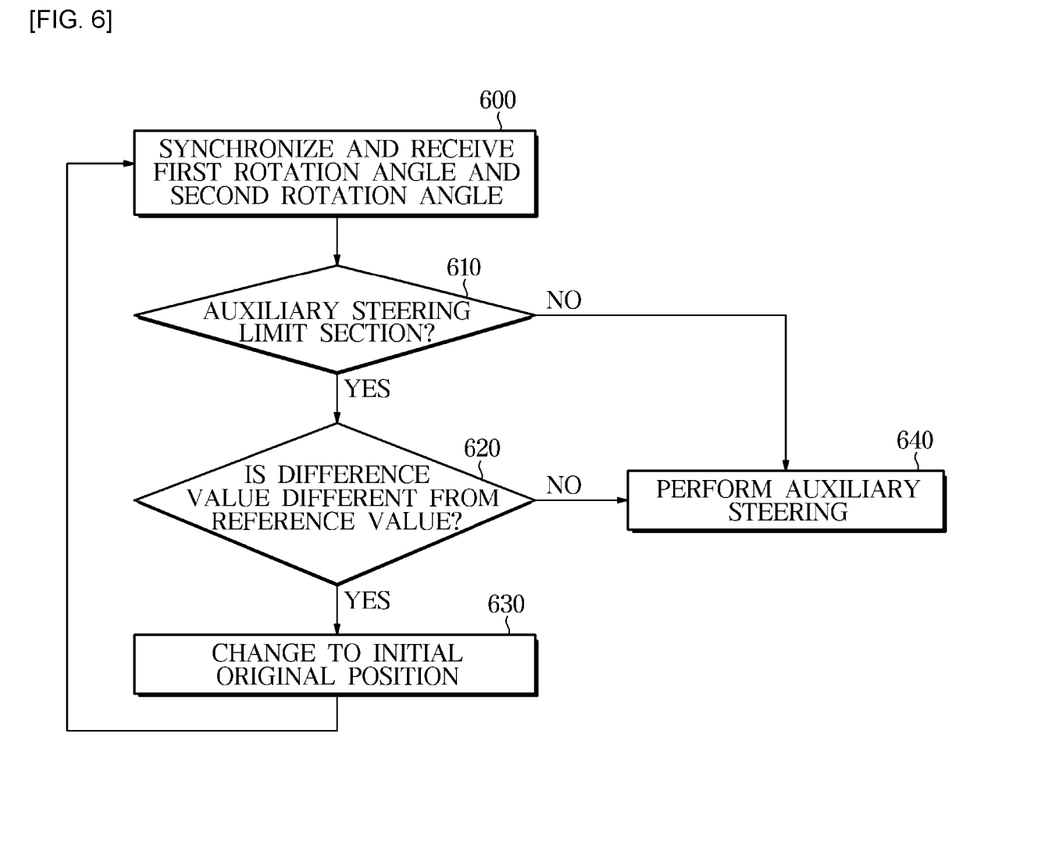
FIG. 6 illustrates an example of a control method of a motor-driven power steering system according to an embodiment.
Figure 7:
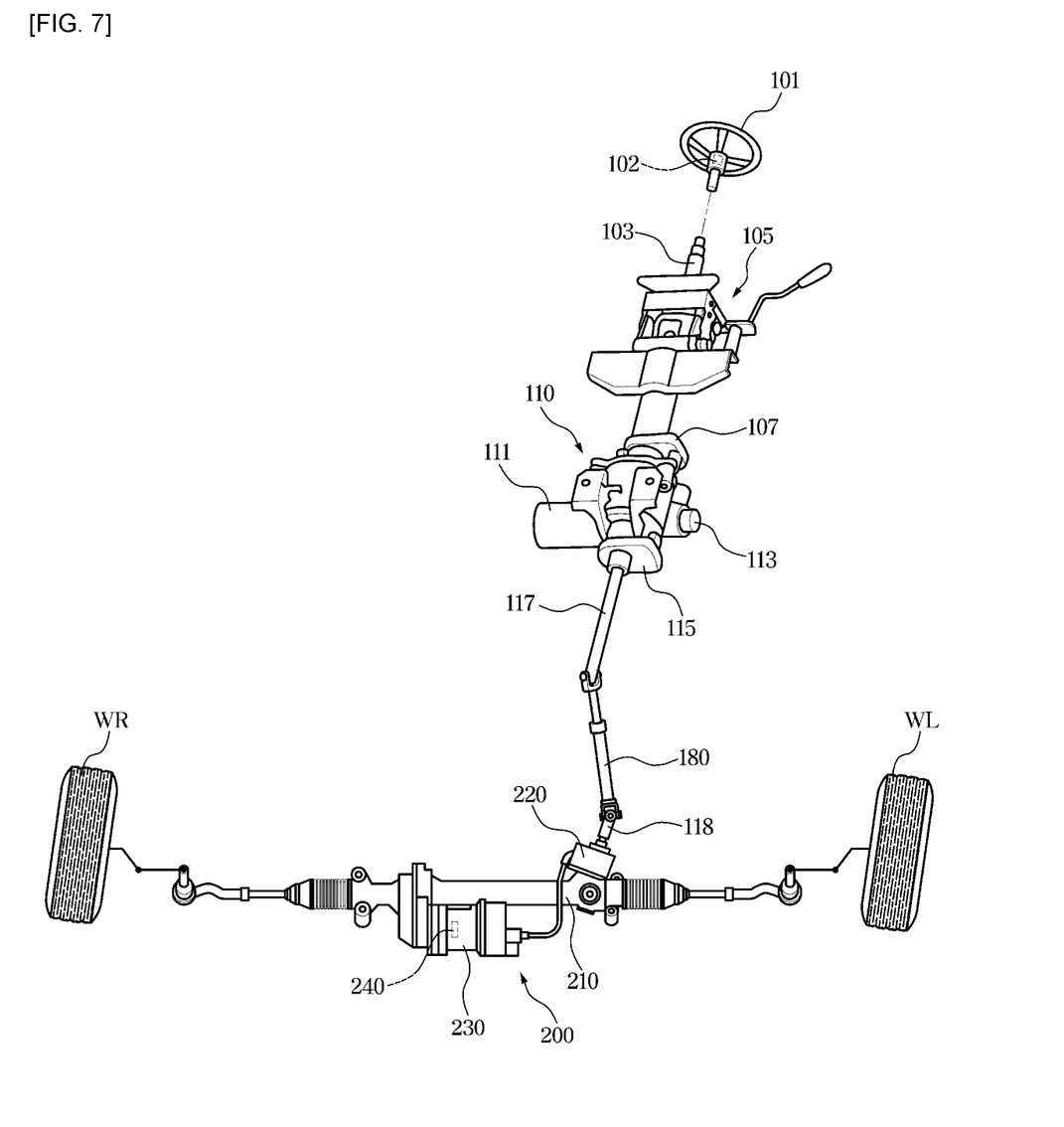
FIG. 7 illustrates a process of assisting steering of wheel.

FIG. 6 illustrates an example of a control method of a motor-driven power steering system according to an embodiment. FIG. 7 illustrates a process of assisting steering of wheel.

Referring to FIG. 6, a vehicle, i.e., the controller 320 of the vehicle, receives a first rotation angle, obtained by the steering wheel angle sensor 102 according to steering of the steering wheel 101, and a second rotation angle obtained by the motor position sensor 240 (600). The controller 320 may receive the first rotation angle through CAN communication. After the ignition switch 10 is turned on to start the motor-driven power steering system 300, the controller 320 may synchronize and receive the first rotation angle obtained by the steering wheel angle sensor 102 and the second rotation angle obtained by the motor position sensor 240.

The controller 320 of the vehicle determines whether a steered position of the steering wheel 101 is in an auxiliary steering limit section B (610). In the auxiliary steering limit section B, a rotation angle of the steering wheel 101 and a rotation angle of the motor 231 are misaligned.

When the steered position of the steering wheel 101 is in the auxiliary steering limit section B (Yes in operation 610), the controller 320 of the vehicle determines whether a difference value between the first rotation angle obtained by the steering wheel angle sensor 102 and the second rotation angle obtained by the motor position sensor 240 is different from a predetermined reference value (620).

When the steered position of the steering wheel 101 is not in the auxiliary steering limit section B (No in operation 610), the controller 320 of the vehicle performs auxiliary steering based on the received first rotation angle of the steering wheel angle sensor 102 and the received second rotation angle of the motor position sensor 240 (640). As shown in FIG. 7, the controller 320 may control the motor driver 310, which drives the motor 231 depending on a degree of torsion of the torsion bar 180, to assist steering of the vehicle wheels WL and WR, by transmitting auxiliary steering power to the rack bar 211 by the auxiliary pinion 234, engaged with the rack bar 211, by rotation of the worm 232 and the worm wheel 233.

When the difference value between the first rotation angle obtained by the steering wheel angle sensor 102 and the second rotation angle obtained by the motor position sensor 240 is different from the predetermined reference value (Yes in operation 620), the controller 320 of the vehicle changes a rotation position of the steering wheel angle sensor 102 and a rotation position of the motor position sensor 240 to an initial original position (630). When a slip between the worm wheel 233, engaged with the worm 232 connected to the motor 231, and the auxiliary pinion 234 occurs, the controller 320 may change the rotation position of the steering wheel angle sensor 102 and the rotation position of the motor position sensor 240 to the initial original position.

When the difference value between the first rotation angle obtained by the steering wheel angle sensor 102 and the second rotation angle obtained by the motor position sensor 240 is not different from the predetermined reference value (No in operation 620), the controller 320 of the vehicle performs auxiliary steering based on the received first rotation angle of the steering wheel angle sensor 102 and the received second rotation angle of the motor position sensor 240 (640). As shown in FIG. 7, the controller 320 may control the motor driver 310, which drives the motor 231 depending on a degree of torsion of the torsion bar 180, to assist steering of the vehicle wheels WL and WR.

When the rotation position of the steering wheel angle sensor 102 and the rotation position of the motor position sensor 240 are changed to the initial original position, the controller 320 of the vehicle receives the first rotation angle, obtained by the steering wheel angle sensor 102 according to steering of the steering wheel 101, and the second rotation angle obtained by the motor position sensor 240 again (600). The controller 320 may synchronize and receive the first rotation angle obtained by the steering wheel angle sensor 102 and the second rotation angle obtained by the motor position sensor 240 again.

When a steered position of the steering wheel 101 received again is not in the auxiliary steering limit section B (No in operation 610) or a difference value between the first rotation angle obtained again by the steering wheel angle sensor 102 and the second rotation angle obtained again by the motor position sensor 240 is not different from the predetermined reference value (No in operation 620), the controller 320 of the vehicle performs auxiliary steering based on the first rotation angle of the steering wheel angle sensor 102 and the second rotation angle of the motor position sensor 240 received again (640). As shown in FIG. 7, the controller 320 may control the motor driver 310, which drives the motor 231 depending on a degree of torsion of the torsion bar 180, to assist steering of the vehicle wheels WL and WR.

Figure 8:
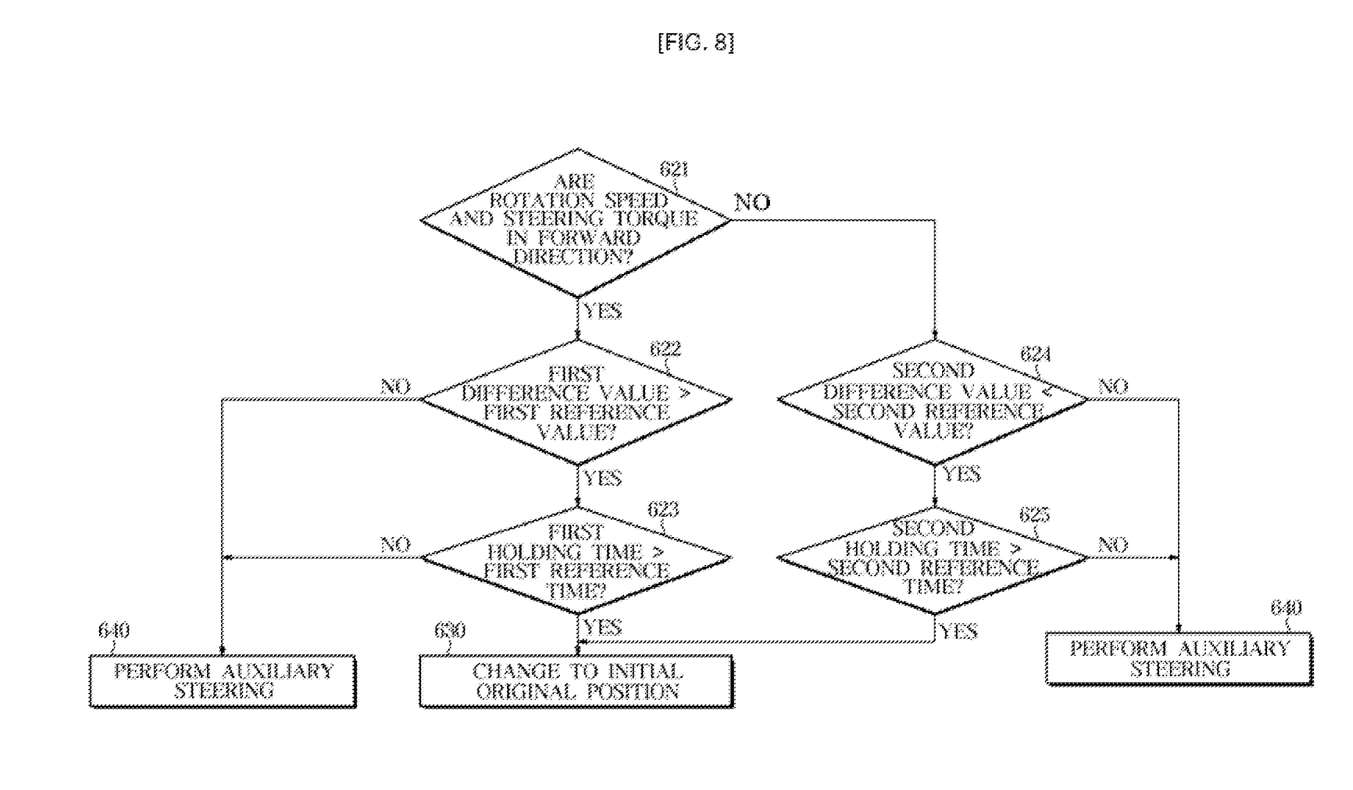
FIG. 8 illustrates another example of a control method of a motor-driven power steering system according to an embodiment.

FIG. 8 illustrates another example of a control method of a motor-driven power steering system according to an embodiment.

Referring to FIG. 8, when the difference value between the first rotation angle obtained by the steering wheel angle sensor 102 and the second rotation angle obtained by the motor position sensor 240 is different from the predetermined reference value (Yes in operation 620), the controller 320 of the vehicle may further receive a rotation speed obtained by the motor position sensor 240 and a steering torque obtained by the torque sensor 220.

When the rotation speed and the steering torque are in a forward direction (Yes in operation 621), the controller 320 of the vehicle may further determine whether a first difference value between the second rotation angle of the motor position sensor 240 and the first rotation angle of the steering wheel angle sensor 102 is greater than a first predetermined reference value (622). When the rotation speed of the motor position sensor 240 and the steering torque of the torque sensor 220 are in the forward direction in a state where a slip between the worm wheel 233 and the auxiliary pinion 234 occurs, the second rotation angle of the motor position sensor 240 increases but the first rotation angle of the steering wheel angle sensor 102 decreases, thereby being misaligned. Accordingly, the controller 320 of the vehicle may further determine whether the first difference value is greater than the first predetermined reference value.

When the first difference value between the second rotation angle of the motor position sensor 240 and the first rotation angle of the steering wheel angle sensor 102 is greater than the first predetermined reference value (Yes in operation 622), the controller 320 of the vehicle may further determine whether a first holding time during which the first difference value remains greater than the first predetermined reference value is longer than a first predetermined reference time (623).

When the first difference value between the second rotation angle of the motor position sensor 240 and the first rotation angle of the steering wheel angle sensor 102 is less than the first predetermined reference value (No in operation 622), the controller 320 of the vehicle performs auxiliary steering based on the received first rotation angle of the steering wheel angle sensor 102 and the received second rotation angle of the motor position sensor 240 (640). As shown in FIG. 7, the controller 320 may control the motor driver 310, which drives the motor 231 depending on a degree of torsion of the torsion bar 180, to assist steering of the vehicle wheels WL and WR.

When the first holding time during which the first difference value between the second rotation angle of the motor position sensor 240 and the first rotation angle of the steering wheel angle sensor 102 remains greater than the first predetermined reference value is longer than the first predetermined reference time (Yes in operation 623), the controller 320 of the vehicle may further change the rotation position of the steering wheel angle sensor 102 and the rotation position of the motor position sensor 240 to the initial original position (630).

When the first holding time during which the first difference value between the second rotation angle of the motor position sensor 240 and the first rotation angle of the steering wheel angle sensor 102 remains greater than the first predetermined reference value is shorter than the first predetermined reference time (No in operation 623), the controller 320 of the vehicle performs auxiliary steering based on the received first rotation angle of the steering wheel angle sensor 102 and the received second rotation angle of the motor position sensor 240 (640). As shown in FIG. 7, the controller 320 may control the motor driver 310, which drives the motor 231 depending on a degree of torsion of the torsion bar 180, to assist steering of the vehicle wheels WL and WR.

Also, when the rotation speed of the motor position sensor 240 and the steering torque of the torque sensor 220 are in a reverse direction (No in operation 621), the controller 320 of the vehicle may further determine whether a second difference value between the second rotation angle of the motor position sensor 240 and the first rotation angle of the steering wheel angle sensor 102 is less than a second predetermined reference value (624). When the rotation speed of the motor position sensor 240 and the steering torque of the torque sensor 220 are in the reverse direction in a state where a slip between the worm wheel 233 and the auxiliary pinion 234 occurs, the second rotation angle of the motor position sensor 240 decreases but the first rotation angle of the steering wheel angle sensor 102 increases, thereby being misaligned. Accordingly, the controller 320 of the vehicle may further determine whether the second difference value is less than the second predetermined reference value.

When the second difference value between the second rotation angle of the motor position sensor 240 and the first rotation angle of the steering wheel angle sensor 102 is less than the second predetermined reference value (Yes in operation 624), the controller 320 of the vehicle may further determine whether a second holding time during which the second difference value remains less than the second predetermined reference value is longer than a second predetermined reference time (625).

When the second difference value between the second rotation angle of the motor position sensor 240 and the first rotation angle of the steering wheel angle sensor 102 is greater than the second predetermined reference value (No in operation 624), the controller 320 of the vehicle performs auxiliary steering based on the received first rotation angle of the steering wheel angle sensor 102 and the received second rotation angle of the motor position sensor 240 (640). As shown in FIG. 7, the controller 320 may control the motor driver 310, which drives the motor 231 depending on a degree of torsion of the torsion bar 180, to assist steering of the vehicle wheels WL and WR.

When the second holding time during which the second difference value remains less than the second predetermined reference value is longer than the second predetermined reference time (Yes in operation 625), the controller 320 of the vehicle may further change the rotation position of the steering wheel angle sensor 102 and the rotation position of the motor position sensor 240 to the initial original position (630).

When the second holding time during which the second difference value between the second rotation angle of the motor position sensor 240 and the first rotation angle of the steering wheel angle sensor 102 remains less than the second predetermined reference value is shorter than the second predetermined reference time (No in operation 625), the controller 320 of the vehicle performs auxiliary steering based on the received first rotation angle of the steering wheel angle sensor 102 and the received second rotation angle of the motor position sensor 240 (640). As shown in FIG. 7, the controller 320 may control the motor driver 310, which drives the motor 231 depending on a degree of torsion of the torsion bar 180, to assist steering of the vehicle wheels WL and WR.

As is apparent from the above, according to the embodiments of the disclosure, the motor-driven power steering system and the control method thereof can prevent a rotation angle of the steering wheel 101 and a rotation angle of the motor 231 from being misaligned in the auxiliary steering limit section B, thereby improving a steering assistance performance.

What is claimed is:

1. A motor-driven power steering system that assists in steering by transmitting auxiliary steering power by driving a motor when a steering wheel is steered, the motor-driven power steering system comprising:
    a motor driver configured to drive the motor; and
    a controller electrically connected to the motor driver,
    wherein the controller is configured to:
        receive a first rotation angle obtained by a steering wheel angle sensor according to steering of the steering wheel and a second rotation angle obtained by a motor position sensor,
        when a steered position of the steering wheel is in an auxiliary steering limit section and a difference value between the first rotation angle and the second rotation angle is different from a predetermined reference value, change a rotation position of the steering wheel angle sensor and a rotation position of the motor position sensor to an initial original position,
        when changed to the initial original position, receive the first rotation angle obtained by the steering wheel angle sensor according to steering of the steering wheel and the second rotation angle obtained by the motor position sensor again, and
        control the motor driver to perform auxiliary steering based on the first rotation angle and the second rotation angle received again.

2. The motor-driven power steering system of claim 1, wherein, when the difference value between the first rotation angle and the second rotation angle is different from the predetermined reference value, the controller is configured to determine that a slip between a worm wheel, engaged with a worm connected to the motor, and an auxiliary pinion occurs.

3. The motor-driven power steering system of claim 1, wherein the controller is configured to:
    when the difference value between the first rotation angle and the second rotation angle is different from the predetermined reference value, further receive a rotation speed obtained by the motor position sensor and a steering torque obtained by a torque sensor,
    when the rotation speed and the steering torque are in a forward direction, further determine whether a first difference value between the second rotation angle and the first rotation angle is greater than a first predetermined reference value,
    when the first difference value is greater than the first predetermined reference value, further determine whether a first holding time during which the first difference value remains greater than the first predetermined reference value is longer than a first predetermined reference time, and
    when the first holding time is longer than the first predetermined reference time, further change the rotation position of the steering wheel angle sensor and the rotation position of the motor position sensor to the initial original position.

4. The motor-driven power steering system of claim 1, wherein the controller is configured to:
    when the difference value between the first rotation angle and the second rotation angle is different from the predetermined reference value, further receive a rotation speed obtained by the motor position sensor and a steering torque obtained by a torque sensor,
    when the rotation speed and the steering torque are in a reverse direction, further determine whether a second difference value between the second rotation angle and the first rotation angle is less than a second predetermined reference value,
    when the second difference value is less than the second predetermined reference value, further determine whether a second holding time during which the second difference value remains less than the second predetermined reference value is longer than a second predetermined reference time, and
    when the second holding time is longer than the second predetermined reference time, further change the rotation position of the steering wheel angle sensor and the rotation position of the motor position sensor to the initial original position.

5. The motor-driven power steering system of claim 1, wherein the controller is configured to be electrically connected to an ignition switch, and
    after the ignition switch is turned on, synchronize and receive the first rotation angle obtained by the steering wheel angle sensor and the second rotation angle obtained by the motor position sensor.

6. The motor-driven power steering system of claim 1, wherein, when changed to the initial original position, the controller is configured to synchronize and receive the first rotation angle obtained by the steering wheel angle sensor and the second rotation angle obtained by the motor position sensor again.

7. A control method of a motor-driven power steering system that assists in steering by transmitting auxiliary steering power by driving a motor when a steering wheel is steered, the control method comprising:
    receiving a first rotation angle obtained by a steering wheel angle sensor according to steering of the steering wheel and a second rotation angle obtained by a motor position sensor;
    determining whether a steered position of the steering wheel is in an auxiliary steering limit section;
    determining whether the steered position of the steering wheel is in the auxiliary steering limit section and a difference value between the first rotation angle and the second rotation angle is different from a predetermined reference value;

when the difference value between the first rotation angle and the second rotation angle is different from the predetermined reference value, changing a rotation position of the steering wheel angle sensor and a rotation position of the motor position sensor to an initial original position, when changed to the initial original position, receiving the first rotation angle obtained by the steering wheel angle sensor according to steering of the steering wheel and the second rotation angle obtained by the motor position sensor again, and performing auxiliary steering based on the first rotation angle and the second rotation angle received again.

8. The control method of claim 7, wherein, when the difference value between the first rotation angle and the second rotation angle is different from the predetermined reference value, it is determined that a slip between a worm wheel, engaged with a worm connected to the motor, and an auxiliary pinion occurs.

9. The control method of claim 7, wherein, when the difference value between the first rotation angle and the second rotation angle is different from the predetermined reference value, the changing to the initial original position further receives a rotation speed obtained by the motor position sensor and a steering torque obtained by a torque sensor, further determines whether the rotation speed and the steering torque are in a forward direction, when the rotation speed and the steering torque are in the forward direction, further determines whether a first difference value between the second rotation angle and the first rotation angle is greater than a first predetermined reference value, when the first difference value is greater than the first predetermined reference value, further determines whether a first holding time during which the first difference value remains greater than the first predetermined reference value is longer than a first predetermined reference time, and when the first holding time is longer than the first predetermined reference time, further changes the rotation position of the steering wheel angle sensor and the rotation position of the motor position sensor to the initial original position.

10. The control method of claim 7, wherein, when the difference value between the first rotation angle and the second rotation angle is different from the predetermined reference value, the changing to the initial original position further receives a rotation speed obtained by the motor position sensor and a steering torque obtained by a torque sensor, further determines whether the rotation speed and the steering torque are in a reverse direction, when the rotation speed and the steering torque are in the reverse direction, further determines whether a second difference value between the second rotation angle and the first rotation angle is less than a second predetermined reference value, when the second difference value is less than the second predetermined reference value, further determines whether a second holding time during which the second difference value remains less than the second predetermined reference value is longer than a second predetermined reference time, and when the second holding time is longer than the second predetermined reference time, further changes the rotation position of the steering wheel angle sensor and the rotation position of the motor position sensor to the initial original position.

11. The control method of claim 7, wherein the receiving of the first rotation angle and the second rotation angle synchronizes and receives the first rotation angle obtained by the steering wheel angle sensor and the second rotation angle obtained by the motor position sensor, after an ignition switch for starting the motor-driven power steering system is turned on.

12. The control method of claim 7, wherein, when changed to the initial original position, the receiving of the first rotation angle and the second rotation angle again synchronizes and receives the first rotation angle obtained by the steering wheel angle sensor and the second rotation angle obtained by the motor position sensor again.

* * * * *